3,687,675
PHOTOGRAPHIC SILVER HALIDE EMULSIONS CONTAINING A CYANINE DYE CONTAINING AT LEAST ONE 1-CYANOALKYL-2-ARYLINDOLE NUCLEUS
Wilbur S. Gaugh, Rochester, N.Y., assignor to Eastman Kodak Company, Rochester, N.Y.
No Drawing. Filed May 3, 1971, Ser. No. 139,859
Int. Cl. G03c 1/28, 1/36
U.S. Cl. 96—101                     17 Claims

ABSTRACT OF THE DISCLOSURE

Novel cyanine dyes comprising two nitrogen-containing heterocyclic nuclei joined by a methine linkage, one of said nuclei being a 1-cyanoalkyl-2-arylindole nucleus joined at the 3-carbon atom thereof to said methine linkage, are useful desensitizers for negative silver halide emulsions and are useful electron acceptors and spectral sensitizers for fogged direct positive silver halide emulsions.

---

This invention relates to novel cyanine dyes and to photographic silver halide emulsions containing those dyes.

One object of this invention is to provide cyanine dyes which desensitize light-sensitive photographic silver halide emulsions.

Another object of this invention is to provide cyanine dyes which are electron acceptors and spectral sensitizers for fogged direct positive silver halide emulsions.

Still another object of this invention is to provide highly stable fogged direct positive silver halide emulsions containing a cyanine dye as electron acceptor and spectral sensitizer.

Another object of this invention is to provide fogged direct positive silver halide emulsions containing methine dye combinations which produce effective spectral sensitization with low stain.

Other objects of this invention will be apparent from this disclosure and the appended claims.

In accordance with one embodiment of this invention, novel cyanine dyes are provided which comprise two nitrogen-containing heterocyclic nuclei joined by a methine linkage, one of said nuclei being a 1-cyanoalkyl-2-arylindole nucleus joined at the 3-carbon atom thereof to said methine linkage.

In accordance with another embodiment of this invention, light-sensitive photographic silver halide emulsions are provided which contain the cyanine dyes described herein.

In accordance with still another embodiment of this invention, fogged direct positive silver halide emulsions are provided which contain the cyanine dyes of this invention. Direct positive emulsions containing the present cyanine dyes exhibit outstanding storage stability. The cyanine dyes described herein demonstrate exceptional compatibility with various emulsion addenda, such as hardeners, speed-increasing compounds, chemical foggants, coating aids, other spectral sensitizers and the like addenda. The subject cyanine dyes are effective spectral sensitizers and electron acceptors for fogged silver halide grains.

One highly useful class of cyanine dyes of this invention has the following formula:

Formula 1

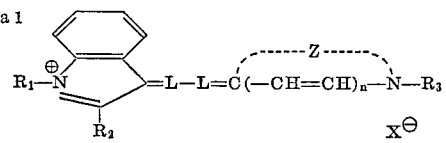

wherein: $R_1$ represents a cyanoalkyl group containing from 1 to 8 and preferably from 2 to 4 carbon atoms, such as 2-cyanoethyl, 3-cyanopropyl, 4-cyano-3-methylbutyl, 4-cyanobutyl, 4-cyano-3-ethylbutyl, 2-cyanobutyl, 3-cyanopentyl, 8-cyanooctyl, etc.; $n$ represents 1 or 2; $R_2$ represents an aryl group, e.g., phenyl, tolyl, naphthyl, methoxyphenyl, chlorophenyl, etc.; L represents a methine linkage, e.g., —CH=, —C(CH$_3$)=, —C(C$_6$H$_5$)=, etc.; $R_3$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., or a substituted alkyl group (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acryloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc., and the like, or an alkenyl group, e.g., allyl, 1-propenyl, 2-butenyl, etc., or an aryl group, e.g., phenyl, tolyl, naphthyl, methoxyphenyl, chlorophenyl, etc.; X represents an acid anion, e.g., chloride, bromide, iodide, p-toluenesulfonate, thiocyanate, sulfamate, methyl sulfate, ethyl sulfate, perchlorate, etc.; Z represents the non-metallic atoms required to complete a sensitizing or a desensitizing heterocyclic nucleus containing from 5 to 6 atoms in the heterocyclic ring including those known to give useful cyanine dyes, which nucleus may contain a second hetero atom such as oxygen, sulfur, selenium or nitrogen, such as the following nuclei: a thiazole nucleus, e.g., thiazole, 4 - methylthiazole, 4 - phenylthiazole, 5 - methylthiazole, 5-phenylthiazole, 4,5-dimethylthiazole, 4,5-diphenylthiazole, 4-(2-thienyl)thiazole, benzothiazole, 4-chlorobenzothiazole, 4- or 5-nitrobenzothiazole, 5-chlorobenzothiazole, 6 - chlorobenzothiazole, 7 - chlorobenzothiazole, 4-methylbenzothiazole, 5-methylbenzothiazole, 6-methylbenzothiazole, 6 - nitrobenzothiazole, 5 - bromobenzothiazole, 6 - bromobenzothiazole, 5-chloro-6-nitrobenzothiazole, 4 - phenylbenzothiazole, 5 - phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, α-naphthothiazole, β-naphthothiazole, β,β-naphthothiazole, 5-methoxy-β,β-naphthothiazole, 5-ethoxy-β-naphthothiazole, 8-methoxy-α-naphthothiazole, 7-methoxy-α-naphthothiazole, 4' - methoxythianaphtheno-7',6',4,5-thiazole, nitro group substituted naphthothiazoles, etc.; an oxazole nucleus, e.g., 4-methyloxazole, 4-nitrooxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorobenzoselenazole, 5-methoxybenzoselenazole, 5-hydroxybenzoselenazole, 5- or 6-nitrobenzoselenazole, 5-chloro-6-nitrobenzoselenazole, tetrahydrobenzoselenazole, α - naphthoselenazole, β-naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5 or 6-nitroindolenine, 3,3-dimethyl-5- or 6-cyanoindolenine, etc.; and, an imidazole nucleus, e.g., imidazole, 1-alkylimidazole, 1-alkyl-4-phenylimidazole, 1 - alkyl - 4,5 - dimethylimidazole, benzimidazole, 1-alkylbenzimidazole, 1-aryl-5,6-dichlorobenzimidazole, 1 - alkyl - α - naphthimidazole, 1-aryl-β-naphthimidazole, 1-alkyl-5-methoxy - α - naphthimidazole, etc., an imidazo[4,5-b]quinoxaline nucleus, e.g., 1,3-dialkylimidazo[4,5-b]quinoxaline such as 1,3-diethylimidazo-[4,5-b]quinoxaline, 6-chloro - 1,3 - diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 1,3-phenylimidazo[4,5-b]quinoxaline, 6-chloro-1,3-diphenylimidazo[4,5-b]quinoxaline, etc.; a 3,3-dialkyl-3H-pyrrolo[2,3-b]pyridine nucleus, e.g., 3,3-dimethyl-3H-pyrrolo[2,3-b]pyridine, 3,3-diethyl-3H-pyrrolo[2,3-b]pyridine, etc.; a thiazolo[4,5-b]quinoline nucleus, and the like. Nuclei wherein Z completes an imidazo[4,5-b]quinoxaline nucleus, a 3H-pyrrolo[2,3-b] pyridine nucleus or a nitro group substituted thiazole, oxazole, selenazole, thiazoline, pyridine, quinoline or indole nucleus are termed desensitizing nuclei; dyes containing such nuclei give especially useful direct positive emulsions and are the preferred dyes of the invention.

As used herein "desensitizing nucleus" refers to those nuclei which, when converted to a symmetrical carbocyanine dye and added to gelatin silver chlorobromide emulsion containing 40 mole percent chloride and 60 mole percent bromide, at a concentration of from 0.01 to 0.2 gram dye per mole of silver, caused by electron trapping at least about 80 percent loss in blue speed of the emulsion when sensitometrically exposed and developed three minutes in Kodak developer D-19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation). Especially useful are cyanoalkyl groups wherein the cyano group is substituted on the ω-carbon atom of the alkyl group.

Dyes which are particularly useful in combination with the present dyes are the methine dyes containing a 4-pyrazole nucleus, such as the dyes described in Van Lare Belgium Pat. 695,356 of Sept. 11, 1967, and preferably the cyanine dyes containing a 4-pyrazole nucleus and a second desensitizing nucleus, as described in Van Lare U.S. Pat. 3,515,722 issued June 2, 1970. Preferred 4-pyrazole dyes are 1,3-diallyl-2-[3,5-dimethyl-1-phenyl-4-pyrazoyl)vinyl]imidazo[4,5-b]quinoxalinium salt, or the dyes of Examples 2 through 16 of Van Lare U.S. Pat. 3,515,727.

The dyes of Formula 1 can be prepared by reacting a 1-cyanoalkyl-2-phenylindole - 3 - carboxaldehyde with a compound of the formula:

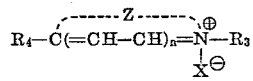

wherein $R_4$ represents methyl, ethyl, benzyl, etc. and $R_3$, X, Z and $n$ have the meanings given above. The reaction is advantageously conducted at reflux in a suitable solvent, such as acetic anhydride. Longer length tetramethine chains, resulting in deeper colored dyes, result when $R_4$ represents propenyl, i.e., $CH_3—CH=CH—$, or 2-phenylpropenyl, i.e.,

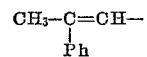

Also useful in the practice of this invention are the trimethine cyanine dyes in which two 1-cyanoalkyl-2-arylindole dyes are joined at the respective 3-carbon atoms thereof to a trimethine linkage. These dyes can be prepared using the general procedure described by Coenen et al. in U.S. Pat. 2,930,694 issued Mar. 29, 1960, except using as the starting material the appropriate 1-cyanoalkyl-substituted intermediates.

The preparation of 1-cyanoalkyl-2-phenylindole-3-carboxaldehydes useful in the preparation of the dyes of this invention is described by Blume et al. in J. Org. Chem., vol. 10, 255, 1945.

The cyanine dyes of the invention are powerful desensitizers for preparing direct positive photographic silver halide emulsions. In addition, they are also useful desensitizers in emulsions used in the process described in Stewart and Reeves U.S. Pat. 3,250,618 issued May 10, 1966.

In accordance with the invention, novel and improved direct positive photographic silver halide emulsions are prepared by incorporating one or more of the cyanine dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl)phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in Kodak DK-50 developer having the composition set forth below, when the emulsion is coated at a silver coverage of 50 mg. to 500 mg. per square foot.

Developer

| | G. |
|---|---|
| N-methyl-p-aminophenol sulfate | 2.5 |
| Sodium sulfite (anhydrous) | 30.0 |
| Hydroquinone | 2.5 |
| Sodium metaborate | 10.0 |
| Potassium bromide | 0.5 |
| Water to make 1.0 liter. | |

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

Developer A

|  | G. |
|---|---|
| N-methyl-p-aminophenol sulfate | 2.5 |
| Ascorbic acid | 10.0 |
| Potassium metaborate | 35.0 |
| Potassium bromide | 1.0 |

Water to 1 liter.
pH of 9.6.

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, vol. XXVIII, January 1957, pp. 1–23 and January 1957, pp. 57–65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons as described and claimed in Illingsworth U.S. Pat. 3,501,307 issued Mar. 17, 1970. The fogged silver halide grains of such emulsions are such that a test portion thereof, when coated as a photographic silver halide emulsion on a support to give a maximum density of at least about one upon processing for 6 minutes at about 68° F. in Kodak DK-50 developer, has a maximum density which is at least about 30% greater than the maximum density of an identical coated test portion which is processed for 6 minutes at about 68° F. in Kodak DK-50 developer after being bleached for about 10 minutes at about 68° F. in a bleach composition of:

| Potassium cyanide | mg | 50 |
|---|---|---|
| Acetic acid (glacial) | cc. | 3.47 |
| Sodium acetate | g. | 11.49 |
| Potassium bromide | mg | 119 |

Water to 1 liter.

The grains of such emulsions will lose at least about 25% and generally at least about 40% of their fog when bleached for 10 minutes at 68° F. in a potassium cyanide bleach composition as described herein. This fog loss can be illustrated by coating the silver halide grains as a photographic silver halide emulsion on a support to give a maximum density of at least 1.0 upon processing for 6 minutes at about 68° F. in Kodak DK-50 developer and comparing the density of such a coating with an identical coating which is processed for 6 minutes at 68° F. in Kodak DK-50 developer after being bleached for about 10 minutes at 68° F. in the potassium cyanide bleach composition. As already indicated, the maximum density of the unbleached coating will be at least 30% greater, generally at least 60% greater than the maximum density of the bleached coating.

The silver halides employed in the preparation of the photographic emulsions useful herein include any of the photographic silver halides as exemplified by silver bromide, silver iodide, silver chloride, silver chlorobromide, silver bromoiodide, silver chlorobromide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. Pat. 3,501,306 issued Mar. 17, 1970. Such grains advantageously have a rather uniform diameter frequency distribution, as described and claimed in Illingsworth U.S. Pat. 3,501,305 issued Mar. 17, 1970. For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in the Photographic Journal, vol. LXXIX, 1949, pp. 330–338. The fogged silver halide grains in these direct positive photographic emulsions of this invention produce a density of at least 0.5 when developed without exposure for 5 minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about 10 mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finished silver halide emulsions and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc., and hydrophilic synthetic resins such as polyvinyl alcohol, polyvinyl pyrrolidone, cellulose ethers, partially hydrolyzed cellulose acetate, and the like.

The binding agents for the emulsion layer of the photographic element can also contain dispersed polymerized vinyl compounds. Such compounds are disclosed, for example, in U.S. Pats. 3,142,568; 3,193,386; 3,062,674 and 3,220,844 and include the water-insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromoiodide, etc. Particularly useful are direct positive fogged emulsions in which the silver salt is a silver bromohalide comprising more than 50 mole percent bromide. Certain dyes of this invention are also useful in emulsions which contain color formers.

The novel emulsions of this invention may be coated on any suitable photographic support, such as glass, film base such as cellulose acetate, cellulose acetate butyrate, polyesters such as poly(ethylene terephthalate), paper, baryta coated paper, polyolefin coated paper, e.g., polyethylene or polypropylene coated paper, which may be electron bombarded to promote adhesion, to produce the novel photographic elements of the invention.

Emulsions of this invention can contain various other dyes in combination with the cyanine dyes described herein.

The following examples are included for a further understanding of this invention.

EXAMPLE 1

1-(2-cyanoethyl)-2-phenylindole

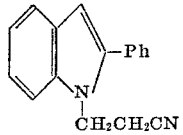

Acrylonitrile, 5 ml. (1.5 mol.) is added to a solution of 9.6 g. (1 mol.) of 2-phenylindole and 1 ml. (catalyst) 40% aqueous trimethylbenzylammonium hydroxide in 30 ml. of dioxane. The resulting solution is warmed to 60° then allowed to stand overnight. The mixture is poured into 200 ml. of water, neutralized with acetic acid, and 700 additional ml. of water is added to give a viscous gum. The aqueous layer is decanted and washed twice with 200 ml. portions of 1:1 ether-benzene solution. The gum is dissolved in the combined organic layer which is then washed with water, dried and evaporated to give a yellow semi-solid. Crystallization from 60 ml. of 95% ethyl alcohol gives 9.9 g. (80.5%) of product as cream-colored crystals, M.P. 86.5–89°.

Recrystallization of 2.0 g. from 10 ml. of 95% ethyl alcohol gives 1.4 g. of product, M.P. 89–90°. Reported: M.P. 88.5–89°.

EXAMPLE 2

1-(2-cyanoethyl)-2-phenylindole-3-carboxaldehyde

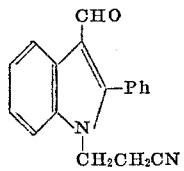

To a pre-formed complex of 10.2 g. (1.2 mols.) of phosphorus oxychloride in 45 ml. of dimethylformamide is added a solution of 14.7 g. (1 mol.) of 1-(2-cyanoethyl)-2-phenylindole in 60 ml. of dimethylformamide. The resulting solution is allowed to stand at room temperature for 3 hours, and then heated at 45–50° for 1 hour. After cooling, the solution is poured into 400 ml. of H₂O and solid sodium acetate is added until the solution is weakly basic, and the resulting suspension is heated at 80° for 15 minutes. After chilling, the solid is collected on a filter, washed with water and dried to give 15.9 g. (96%) of off-white plates, M.P. 156–158°.

EXAMPLE 3

1'-(2-cyanoethyl)-1,3-diethyl-2'-phenylimidazo[4,5-b] quinoxalino-3'-indolocarbocyanine p-toluenesulfonate

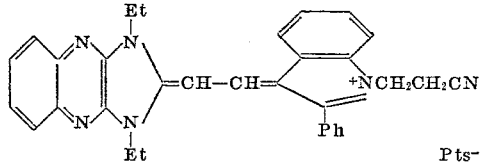

A mixture of 1.37 g. (1 mol.) of 1-(2-cyanoethyl)-2-phenylindole-3-carboxaldehyde, 2.06 g. (1 mol.) of 1,3-diethyl-2-methylimidazo[4,5-b]quinoxalinium p - toluenesulfonate and 15 ml. of acetic anhydride is heated at reflux for 5 minutes. After chilling, 400 ml. of ether is added. The crude dye is collected on a filter and washed with ether. After two recrystallizations from isopropyl alcohol, 1.80 g. (54%) of pure dye is obtained as bright orange crystals, M.P. 233–234°.

EXAMPLE 4

6 - chloro - 1' - (2 - cyanoethyl) - 1,2',3 - triphenylimidazo-[4,5-b]quinoxalino - 3' - indolocarbocyanine p-toluenesulfonate A mixture of 1.11 g. (1 mol.) of 1-(2-cyanoethyl)-2-phenylindole-3-carboxaldehyde, 2.17 g. (1 mol.) of 6-chloro - 2 - methyl - 1,3 - diphenylimidazo[4,5-b]quinoxalinium p-toluenesulfonate, and 15 ml. of acetic anhydride is heated at reflux for 5 minutes. After chilling, 300 ml. of ether is added and the resultant viscous oil stirred under ether until crystalline. The crude dye is collected on a filter and washed with ether. After two recrystallizations from methyl alcohol, 1.75 g. (55%) of pure dye is obtained as orange prisms, M.P. 298° (dec.).

EXAMPLE 5

1-(2-cyanoethyl) - 3' - ethyl - 6' - nitro - 2 - phenyl-3-indolothiacarbocyanine p-toluenesulfonate

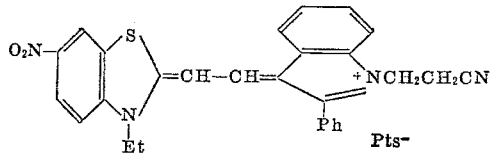

A mixture of 1.37 g. (1 mol.) of 1-(2-cyanoethyl)-2-phenylindole-3-carboxaldehyde, 1.98 g. (1 mol.) of 3-ethyl-2-methyl-6-nitrobenzothiazolium p-toluenesulfonate, and 15 ml. of acetic anhydride is heated at reflux for 5 minutes. After chilling, 300 ml. of ether is added. The crude dye is collected on a filter and washed with ether. After two recrystallizations from acetic acid, 2.72 g. (84%) of pure dye is obtained as orange crystals. M.P. 247–250° (dec.).

EXAMPLE 6

1-(2-cyanoethyl)-1',3',3'-trimethyl-2-phenyl-3-indolo-(3H)-pyrrolo[2,3-b]pyridocarbocyanine perchlorate

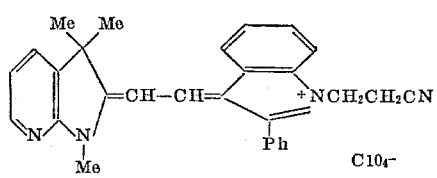

A mixture of 1.37 g. (1 mol.) of 1-(2-cyanoethyl)-2-phenylindole - 3-carboxaldehyde, 0.87 g. (1 mol.) of 2- methylene - 1,3,3-trimethyl-(3H)-pyrrolo[2,3-b]pyridine, 1.0 g. (1 mol.) of p-toluenesulfonic acid, and 15 ml. of acetic anhydride is heated at reflux for 5 minutes. After chilling, 300 ml. of ether is added. The crude dye is collected on a filter and washed with ether. The solid is dissolved in 100 ml. of hot ethyl alcohol and treated with a solution of 1.2 g. ( 1 mol.) of sodium perchlorate in aqueous ethyl alcohol. After chilling, the solid is collected on a filter and washed first with water, then with ethyl alcohol. After recrystallization from acetic acid, 1.90 g. (73%) of pure dye is obtained as orange-red needles, M.P. 272–275°.

EXAMPLE 7

1'-(2-cyanoethyl)-1,3,3-trimethyl-5-nitro-2'-phenylindo-3'-indolocarbocyanine p-toluenesulfonate

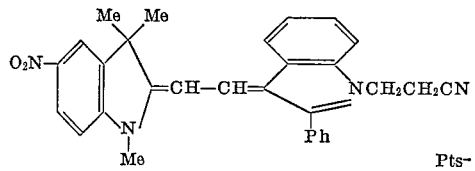

A mixture of 1.37 g. (1 mol.) of 1-(2-cyanoethyl)-2-phenylindole-3-carboxaldehyde, 1.95 g. (1 mol.) of 1,2,3,3-tetramethyl-5-nitroindolium p-toluenesulfonate, and 15 ml. of acetic anhydride is heated at reflux for 15 minutes. After chilling, 300 ml. of ether is added. The crude dye is collected on a filter and washed with ether. After two recrystallizations from ethyl alcohol, 1.60 g. (50%) of pure dye is obtained as tiny orange crystals with a gold reflex, M.P. 242–245°.

EXAMPLE 8

1-(2-cyanoethyl)-3'-methyl-5'-nitro-2-phenyl-3-indolooxacarbocyanine p-toluenesulfonate A mixture of 1.37 g. (1 mol.) of 1-(2-cyanoethyl)-2-phenylindole-3-carboxaldehyde, 1.81 g. (1 mol.) of 1,2-dimethyl-5-nitrobenzoxazolium p-toluenesulfonate and 15 ml. of acetic anhydride is heated at reflux for 5 minutes. After chilling, 300 ml. of ether is added. The crude dye is collected on a filter and washed with ether. The solid is refluxed in 400 ml. of acetic anhydride and filtered while hot. The solid which does not dissolve is recrystallized from methyl alcohol to give 0.58 g. (19%) of pure dye as tan crystals, M.P. 268–270°.

Other dyes of the invention which can be prepared by the method of the above examples, or by related procedures used in synthesizing cyanine dyes include:

1-(4-cyanobutyl)-1'-ethyl-2-phenyl-3-indolo-4'-carbocyanine bromide
1,1'-di(2-cyanoethyl)-2,2'-diphenyl-3,3'-indolocarbocyanine p-toluenesulfonate
1'-(2-cyanoethyl)-5'-nitro-1,2',3-triphenylimidazo[4,5-b]quinoxaline-3'-indolodicarbocyanine p-toluenesulfonate
1-(5-cyanopentyl)-3'-ethyl-2-phenyl-3-indolothiacarbocyanine p-toluenesulfonate The above dyes are useful desensitizers for negative silver halide emulsions and are effective electron acceptors and spectral sensitizers for fogged direct positive silver halide emulsions.

The dyes of Examples 3–8 are photographically tested for usefulness as an electron acceptor and spectral sensitizer for fogged direct positive photographic silver halide emulsions by the following procedure.

A gelatin silver bromoiodide emulsion (2.5 mole percent of the halide being iodide) and having an average grain size of about 0.2 micron is prepared by adding an aqueous solution of potassium bromide and potassium iodide, and an aqueous solution of silver nitrate, simultaneously to a rapidly agitated aqueous gelatin solution at a temperature of 70° C., over a period of about 35 minutes. The emulsion is chill-set, shredded and washed by leaching with cold water in the conventional manner.

The emulsion is reduction-gold fogged by first adding 0.2 mg. of thiourea dioxide per mole of silver and heating for 60 minutes at 65° C. and then adding 4.0 mg. of potassium chloroaurate per mole of silver and heating for 60 minutes at 65° C. The dye of the above examples is then added to the above fogged emulsion in amounts sufficient to give a concentration of 0.08 gram of the dye per mole of silver. The resulting emulsion is coated on a cellulose acetate film support at a coverage of 100 mg. of silver and 400 mg. of gelatin per square foot of support.

A sample of the coated support is then exposed on an Eastman Ib sensitometer using a tungsten light source and processed for 6 minutes at room temperature in Kodak D-19 developer which has the following composition:

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | then fixed, washed and dried. The results are listed in Table I hereinafter.

TABLE I

| Dye of example number | Conc., g./mole of silver | Relative clear speed | $D_{max.}$ | $D_{min.}$ | Sens. max. (nm.) |
|---|---|---|---|---|---|
| 3 | .800 | 1290 | 1.50 | .04 | 540 |
| 4 | .800 | 1450 | 1.45 | .04 | 570 |
| 5 | .800 | 832 | 1.50 | .11 | 560 |
| 6 | .800 | 933 | 1.54 | .04 | 530 |
| 7 | .800 | 1350 | 1.50 | .04 | 550 |
| 8 | .800 | 407 | 1.50 | .05 | 510 |

The above photographic tests are repeated except that the emulsions are incubated for one week at about 50° C. and at 50% relative humidity prior to exposure. The results are shown in Table II below.

TABLE II

| Example number | Conc., g./mole of silver | $D_{max.}$ | $D_{min.}$ | Percent $D_{max.}$ loss incubation 1 wk., 50° C. 50% relative humidity |
|---|---|---|---|---|
| 3 | .550 | 1.53 | .04 | 45.2 |
| 4 | .550 | 1.48 | .04 | 44.6 |
| 5 | .550 | 1.49 | .07 | 55.2 |
| 6 | .550 | 1.60 | .04 | 48.2 |
| 7 | .550 | 1.50 | .04 | 46.6 |

The above table demonstrates the exceptional storage stability of fogged direct positive emulsions containing the subject cyanoalkyl dyes. Similar incubation tests with many related prior art electron accepting and spectral sensitizing dyes result in over 60% losses in maximum density.

Particularly good sensitization with low stain is achieved when the above examples are repeated but using in combination with the present 1-cyanoalkyl substituted 2-arylindole dyes a similar concentration of a methine dye containing a 4-pyrazole nucleus, such as the cyanine dyes containing a 4-pyrazole nucleus and a desensitizing nucleus, e.g., a dye of Examples 2–16 of Van Lare U.S. Pat. 3,515,722 issued June 2, 1970 or the dye 1,3-diallyl-2-[3,5-dimethyl-1-phenyl - 4 - pyrazolyl)vinyl]imidazo[4,5-b]quinoxalinium salt.

The N-cyanoalkyl substituted dyes of this invention generally provide a maximum sensitivity of from 5 to 15 nm. shorter than the corresponding N-alkyl substituted dyes of the prior art. The shorter sensitivity imparted by the present dyes can be useful in various photographic products, such as in color films or films which have low sensitivity to conventional red safelights. For example, the dye of Example 6 produces a maximum sensitivity of absout 5 nm. shorter than the corresponding N-methyl dye. Emulsions sensitized with the dye of Example 6 can be handled under conventional safelights with less risk of fogging than emulsions sensitized with the corresponding prior art N-methyl substituted dye.

The invention has been described in detail with particular reference to preferred embodiments thereof, but, it will be understood that variations and modifications can be effected within the spirit and scope of the invention.

I claim:

1. A fogged direct positive photographic silver halide emulsion containing a cyanine dye comprising two nitrogen-containing heterocyclic nuclei joined by a methine linkage, one of said nuclei being a 1-cyanoalkyl-2-arylindole nucleus joined at the 3-carbon atom thereof to said methine linkage.

2. The fogged direct positive emulsion of claim 1 wherein said second nucleus is a desensitizing nucleus.

3. A fogged direct positive photographic silver halide emulsion containing a cyanine dye having the following formula:

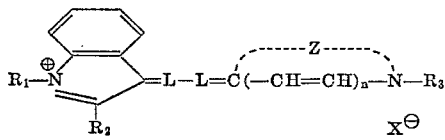

wherein $R_1$ represents a cyanoalkyl group containing from 1 to 8 carbon atoms; $R_2$ represents an aryl group; X represents an acid anion; $n$ represents an integer of from 1 to 2; each L represents a methine group; $R_3$ represents an alkyl group or an aryl group; and, Z represents the nonmetallic atoms required to complete a heterocyclic nucleus containing 5 to 6 atoms in the ring.

4. A fogged direct positive photographic silver halide emulsion containing a cyanine dye having the following formula:

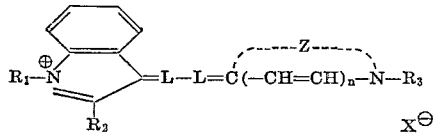

wherein $R_1$ represents a cyanoalkyl group containing from 1 to 8 carbon atoms; $R_2$ represents an aryl group; X represents an acid anion; $n$ represents an integer of from 1 to 2; each L represents a methine group; $R_3$ represents an alkyl group or an aryl group; and, Z represents a desensitizing nucleus selected from the group consisting of an imidazo[4,5-b]quinoxaline nucleus; a nitro-substituted benzothiazole nucleus; a 3H-pyrrolo[2,3-b]pyridine nucleus; a nitro-substituted indolenine nucleus; and, a nitro-substituted benzoxazole nucleus.

5. A fogged direct positive silver halide emulsion spectrally sensitized with a dye selected from the group consisting of 1'-(2-cyanoethyl)-1,3-diethyl-2'-phenylimidazo[4,5-b] quinoxalino-3'-indolocarbocyanine salt;
6-chloro-1'-(2-cyanoethyl)-1,2',3-triphenylimidazo[4,5-b] quinoxalino-3'-indolocarbocyanine salt;
1-(2-cyanoethyl)-3'-ethyl-6'-nitro-2-phenyl-3-indolothiacarbocyanine salt;
1-(2-cyanoethyl)-1',3',3'-trimethyl-2-phenyl-3-indolo (3H)pyrrolo[2,3-b]pyridocarbocyanine salt;
1'-(2-cyanoethyl)-1,3,3-trimethyl-5-nitro-2'-phenylindo-3'-indolocarbocyanine salt and
1-(2-cyanoethyl)-3'-methyl-5'-nitro-2-phenyl-3-indolooxacarbocyanine salt.

6. A fogged direct positive silver halide emulsion spectrally sensitized with 1-(2-cyanoethyl)-1',3',3'-trimethyl - 2 - phenyl - 3 - indolo(3H)pyrrolo[2,3-b]pyridocarbocyanine salt.

7. A direct positive, photographic emulsion in accordance with claim 4 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

Potassium cyanide _____ mg__ 50
Acetic acid (glacial) _____ cc__ 3.47
Sodium acetate _____ g__ 11.49
Potassium bromide _____ mg__ 119
Water to 1 liter.

8. A direct positive, photographic emulsion in accordance with claim 5 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

Potassium cyanide _____ mg__ 50
Acetic acid (glacial) _____ cc__ 3.47
Sodium acetate _____ g__ 11.49
Potassium bromide _____ mg__ 119
Water to 1 liter.

9. A direct positive, photographic emulsion in accordance with claim 4 which comprises fogged silver halide grains, at least 95%, by weight, of said grains having a size which is within about 40% of the average grain size.

10. A direct positive photographic emulsion in accordance with claim 5 which comprises fogged silver halide grains, at least 95%, by weight, of said grains having a size which is within about 40% of the average grain size.

11. A fogged direct positive photographic silver halide emulsion in accordance with claim 1 wherein said emulsion also contains a methine dye having a 4-pyrazole nucleus.

12. A fogged direct positive photographic silver halide emulsion in accordance with claim 3 wherein said emulsion also contains a cyanine dye having a 4-pyrazole nucleus and a second desensitizing nucleus.

13. A fogged direct positive photographic silver halide emulsion in accordance with claim 6 wherein said emulsion also contains 1,3-diallyl-2-[3,5-dimethyl-1-phenyl-4-pyrazolyl)vinyl]imidazo[4,5-b]quinoxalinium salt.

14. A direct positive, photographic emulsion in accordance with claim 13 which comprises fogged silver halide grains, said grains being such that a test portion thereof, when coated as a photographic silver halide emulsion on a support to give a maximum density of at least about 1 upon processing for 6 minutes at about 68° F. in Kodak DK–50 developer, has a maximum density which is at least about 30% greater than the maximum density of an identical coated test portion which is processed for 6 minutes at about 68° F. in Kodak DK–50 developer after being bleached for about 10 minutes at about 68° F. in a bleach composition of:

Potassium cyanide _____ mg__ 50
Acetic acid (glacial) _____ cc__ 3.47
Sodium acetate _____ g__ 11.49
Potassium bromide _____ mg__ 119
Water to 1 liter.

15. A direct positive, photographic emulsion in accordance with claim 13 which comprises fogged silver halide grains, at least 95%, by weight, of said grains having a size which is within about 40% of the average grain size.

16. A light sensitive photographic silver halide emulsion containing a cyanine dye comprising two nitrogen-containing heterocyclic nuclei joined by a methine linkage, one of said nuclei being a 1-cyanoalkyl-2-arylindole nucleus joined at the 3-carbon atom thereof to said methine linkage.

17. A light sensitive photographic silver halide emulsion containing a cyanine dye having the following formula:

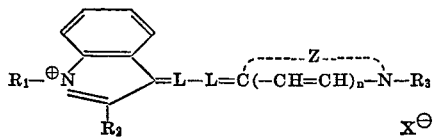

wherein $R_1$ represents a cyanoalkyl group containing from 1 to 8 carbon atoms; $R_2$ represents an aryl group; X represents an acid anion; $n$ represents an integer of from 1 to 2; each L represents a methine group; $R_3$ represents an alkyl group or an aryl group; and, Z represents the non-metallic atoms required to complete a heterocyclic nucleus containing 5 to 6 atoms in the ring.

References Cited

UNITED STATES PATENTS

| 2,930,694 | 3/1960 | Coenen et al. | 96—107 |
| 3,314,796 | 4/1967 | Gotze et al. | 96—107 |
| 3,505,070 | 4/1970 | Litzerman et al. | 96—107 |

NORMAN G. TORCHIN, Primary Examiner

R. E. FICHTER, Assistant Examiner

U.S. Cl. X.R.

96—107, 120